United States Patent
Ying et al.

(10) Patent No.: US 9,026,653 B2
(45) Date of Patent: May 5, 2015

(54) IDENTIFYING A DEVICE TO A NETWORK

(75) Inventors: Wen-Ping Ying, Bellevue, WA (US);
Dinh C. Tat, Bellevue, WA (US);
Michael E. Prise, Kirkland, WA (US)

(73) Assignee: AT&T Mobility II LLC, Atlanta, GA (US)

(*) Notice: Subject to any disclaimer, the term of this patent is extended or adjusted under 35 U.S.C. 154(b) by 1603 days.

(21) Appl. No.: 10/763,862

(22) Filed: Jan. 22, 2004

(65) Prior Publication Data

US 2005/0144236 A1 Jun. 30, 2005

Related U.S. Application Data

(60) Provisional application No. 60/526,661, filed on Dec. 3, 2003.

(51) Int. Cl.
*G06F 15/173* (2006.01)
*H04W 8/24* (2009.01)
*H04W 4/12* (2009.01)

(52) U.S. Cl.
CPC ............ *H04W 8/245* (2013.01); *H04W 4/12* (2013.01)

(58) Field of Classification Search
USPC .................... 709/206, 225, 248; 370/338
See application file for complete search history.

(56) References Cited

U.S. PATENT DOCUMENTS

| | | | | |
|---|---|---|---|---|
| 5,335,278 A | * | 8/1994 | Matchett et al. | 380/248 |
| 5,983,265 A | * | 11/1999 | Martino, II | 709/206 |
| 6,208,870 B1 | * | 3/2001 | Lorello et al. | 455/466 |
| 6,445,914 B1 | * | 9/2002 | Findikli et al. | 455/411 |
| 6,662,015 B2 | * | 12/2003 | Furlong | 455/456.5 |
| 6,857,021 B1 | * | 2/2005 | Schuster et al. | 709/227 |
| 7,010,699 B1 | * | 3/2006 | Agarwal et al. | 726/5 |
| 7,107,312 B2 | * | 9/2006 | Hackbarth et al. | 709/204 |
| 2002/0129103 A1 | * | 9/2002 | Birkler et al. | 709/203 |
| 2002/0146097 A1 | * | 10/2002 | Vuori | 379/88.22 |
| 2002/0187775 A1 | * | 12/2002 | Corrigan et al. | 455/414 |
| 2002/0187781 A1 | * | 12/2002 | Furlong | 455/433 |
| 2003/0023849 A1 | * | 1/2003 | Martin et al. | 713/176 |
| 2003/0051041 A1 | * | 3/2003 | Kalavade et al. | 709/229 |
| 2003/0065788 A1 | * | 4/2003 | Salomaki | 709/227 |
| 2003/0103484 A1 | * | 6/2003 | Oommen et al. | 370/338 |
| 2003/0126209 A1 | * | 7/2003 | Wen et al. | 709/204 |
| 2003/0191823 A1 | * | 10/2003 | Bansal et al. | 709/220 |
| 2003/0236981 A1 | * | 12/2003 | Marmigere et al. | 713/168 |
| 2004/0152446 A1 | * | 8/2004 | Saunders et al. | 455/411 |
| 2004/0156326 A1 | * | 8/2004 | Chithambaram | 370/310 |
| 2005/0060361 A1 | * | 3/2005 | Chatrath et al. | 709/200 |
| 2005/0060551 A1 | * | 3/2005 | Barchi et al. | 713/182 |
| 2005/0073982 A1 | * | 4/2005 | Corneille et al. | 370/338 |

(Continued)

OTHER PUBLICATIONS

Digital cellular telecommunication system (Phase 2+) (GSM); Universal Mobile Telecommunicaitons System (UMTS); Numbering addressing and identification. ETSI TS 123 003 V3.5.0, 1999.*

*Primary Examiner* — Scott B Christensen
(74) *Attorney, Agent, or Firm* — Hartman & Citrin LLC

(57) ABSTRACT

A communication arrangement includes a Short Message Service Center (SMS-SC), a permissions facility (such as a customer care facility) to associate permissions and service requests, and a network element configured to receive a Short Message Service message via the SMS-SC. The network element extracts a device identifier from the message, applies the device identifier to locate device status information, and interacts with the facility to determine permissions to apply to service requests originating from the device.

16 Claims, 7 Drawing Sheets

(56) References Cited

U.S. PATENT DOCUMENTS

| | | | |
|---|---|---|---|
| 2005/0124288 A1* | 6/2005 | Karmi et al. | 455/3.01 |
| 2005/0153741 A1* | 7/2005 | Chen et al. | 455/558 |
| 2006/0111110 A1* | 5/2006 | Schwarz et al. | 455/439 |
| 2006/0168095 A1* | 7/2006 | Sharma et al. | 709/217 |
| 2007/0006291 A1* | 1/2007 | Barari et al. | 726/10 |
| 2007/0027692 A1* | 2/2007 | Sharma et al. | 704/270.1 |
| 2007/0118629 A1* | 5/2007 | Kerdraon et al. | 709/223 |
| 2007/0124490 A1* | 5/2007 | Kalavade et al. | 709/230 |

\* cited by examiner

IDENTIFYING A DEVICE TO A NETWORK

PRIORITY

This application claims the benefit of U.S. Provisional Application No. 60/526,661, filed on Dec. 3, 2003.

TECHNICAL FIELD

The present disclosure relates to computer networks and devices that communicate with computer networks.

BACKGROUND

Wireless telephones are devices capable of transmitting and receiving voice and/or data (non-voice) information to and from a network without the use of wires, cables, or other tangible transmission media. So-called cellular telephones are a common example of wireless phones.

Wireless telephones and the networks by which they communicate operate according to various technologies, including analog mobile phone service (AMPS), circuit switching, packet switching, wireless local area network (WLAN) protocols such as IEEE 802.11 compliant networks, wireless wide-area networks (WWAN), short-range RF systems such as Bluetooth, code division multiple access (CDMA), time division multiple access (TDMA), frequency-division multiplexing (FDM), spread-spectrum, global system for mobile communications (GSM), high-speed circuit-switched data (HCSD), general packet radio system (GPRS), enhanced data GSM environment (EDGE), and universal mobile telecommunications service (UMTS). Of course, these are only examples, and other technologies may be employed in wireless communication as well.

Herein, the term 'wireless device' is meant to include wireless telephones (including cellular, mobile, and satellite telephones), and also to include a variety of other wireless devices, including wireless web-access telephones, automobile, laptop, and desktop computers that communicate wirelessly, and wireless personal digital assistants (PDAs). In general, the term 'wireless device' refers to any device with wireless communication capabilities.

Many companies produce wireless telephones and other wireless devices. Among the more well-known producers are Nokia®, Ericsson®, Motorola®, Panasonic®, Palm® Computer, and Handspring®. A variety of producers also provide wireless devices comprising versions of the Microsoft® Windows® operating software.

A mobile device, also called mobile equipment, is a portable communication device that typically, but not necessarily, is also a wireless device. Laptop computers are examples of mobile devices.

GSM technology provides separate identities for devices that access GSM networks, and the users of those devices. Thus, a device that accesses a GSM network may comprise a device identifier, to distinguish the device from others that access the network. Each person that uses the device may be assigned a subscriber identifier. Thus, a single subscriber may, at different times, access the GSM network from multiple devices, and a single device may be employed to access the network by multiple subscribers.

An equipment identify registry (EIR) is a network element responsible for collecting and managing device identifiers. The collection of device identifiers comprised by an EIR may be applied for fraud control, customer service, and other uses. Some networks employing technology other than GSM do not provide for separate equipment and subscriber identity, and thus do not employ an EIR. TDMA networks are an example of networks that do not provide for separate device and subscriber identity. Providing for EIR-type functionality in such networks may involve cost-prohibitive replacement and/or upgrades of switching and other network elements.

There is a need for cost-effective equipment identity management in networks that do not comprise an EIR.

SUMMARY

The following summary is intended to highlight and introduce some aspects of the disclosed embodiments, but not to limit the scope of the invention. Thereafter, a detailed description of illustrated embodiments is presented, which will permit one skilled in the relevant art to make and use aspects of the invention. One skilled in the relevant art can obtain a full appreciation of aspects of the invention from the subsequent detailed description, read together with the Figures, and from the claims (which follow the detailed description).

A communication arrangement includes a Short Message Service Center (SMS-SC), a Customer Care Facility or other facility to associate permissions with service requests, and a network element configured to receive a Short Message Service message via the SMS-SC. The network element extracts a device identifier from the message, applies the device identifier to locate device status information, and interacts with the Customer Care Facility to determine permissions to apply to service requests originating from the device.

BRIEF DESCRIPTION OF THE DRAWINGS

The headings provided herein are for convenience only and do not necessarily affect the scope or meaning of the claimed invention.

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well known structures and functions have not been shown or described in detail to avoid unnecessarily obscuring the description of the embodiments of the invention. References to "one embodiment" or "an embodiment" do not necessarily refer to the same embodiment, although they may.

Herein, "logic" refers to any information having the form of instruction signals and/or data that may be applied to affect the operation of a processing device. Examples of processing devices are computer processors (processing units), microprocessors, digital signal processors, controllers and microcontrollers, and so on. Logic may be formed from signals stored in a device memory. Software is one example of such logic. Examples of device memories that may comprise logic include RAM (random access memory), flash memories, ROMS (read-only memories), EPROMS (erasable programmable read-only memories), and EEPROMS (electrically erasable programmable read-only memory). Logic may also be comprised by digital and/or analog hardware circuits, for example, hardware circuits comprising logical AND, OR, XOR, NAND, NOR, and other logical operations. Logic may be formed from combinations of software and hardware.

A "network element" is any one or more devices of a communication network, e.g. devices that participate at least occasionally in the operation of the network. A "service request" is a signal to cause the network to perform some operation.

Figure 1:
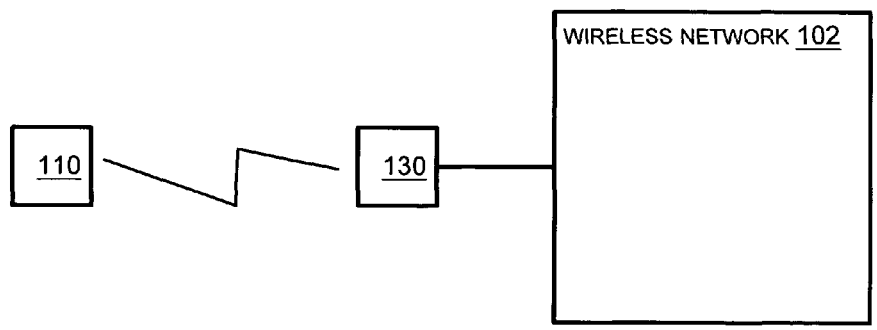
FIG. 1 is a block diagram of an embodiment of a wireless communication arrangement.

FIG. 1 is a block diagram of an embodiment of a wireless communication arrangement. One or more antennae 130 are coupled to a wireless network 102. A mobile device 110 communicates wirelessly with the network 102 via the antennae 130.

Figure 2:
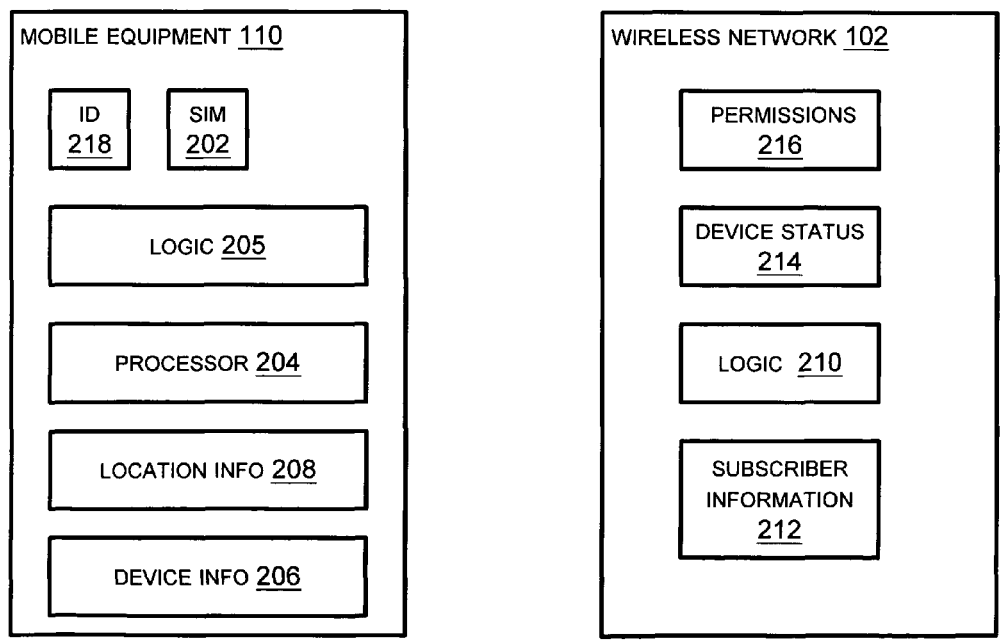
FIG. 2 is a more detailed block diagram of an embodiment of a wireless communication arrangement.

FIG. 2 is a more detailed block diagram of an embodiment of a wireless communication arrangement. Mobile equipment 110 comprises a mobile equipment id 218, device information 206, location information 208, a processor 204, and logic 205. The mobile equipment 110 also comprises a subscriber identity module (SIM) 202.

The id 218 identifies the device from among devices that access the network 102. For example, the id 218 may comprise an International Mobile Equipment Identity (IMEI).

Device information 206 comprises information about the device's 110 capabilities to receive, process, and display information. For example, device information 206 may comprise information about the device's 110 graphic display capabilities, communication bandwidth, and processor speed. Device information 206 may also include information about the device model, the version(s) of logic 205 comprised by the device 110 (e.g. BIOS version, operating system version, software versions, etc.), the last know error to occur during the operation of the device 110, installed software applications, and language settings, among other things. Device information 206 may also comprise information about how the BIOS, operating system, installed software applications, and other components of the mobile device 110 are configured to operate.

Location information 208 comprises information about the location of the mobile device 110. Such information may be useful in determining the type of information to deliver, the quality and quantity of information to deliver, and so on. In other words, location information 208 may be useful when delivering services to the device 110. Location information 208 may be 'literal', e.g. a geographic address or location, or 'logical', e.g. "In a Meeting", "In Transit", and so on.

The logic 205, when applied to the processor 204, may cause the mobile equipment 110 to carry out acts of and in accordance with the methods described herein.

The SIM 202 and the mobile equipment 110 may be coupled in such a manner that the two may be easily coupled and decoupled. For example, the SIM 202 may insert into a slot in the mobile equipment 110. A subscriber of the network may remove the SIM 202 from the mobile equipment 110 and couple it to another mobile device. Likewise, another subscriber may replace the SIM 202 in the mobile equipment 110 with another SIM representing the other subscriber.

The wireless network 102 comprises subscriber information 212, device status 214, and permissions 216. The wireless network 102 also comprises logic 210.

Subscriber information 212 may comprise such information as payment parameters, service provision information, service delivery information, billing and settlement information, access network information, and security and access control information.

Device status 214 includes information about the status of mobile equipment that accesses the network 102. For example, the lost or stolen status of the mobile device 110 may be indicated by the device status 214.

Permissions 216 indicate the network services that should be made available to the subscriber associated with the SIM 202.

The logic 210 may cause the network 102 to carry out acts of and in accordance with the methods described herein.

Figure 3:
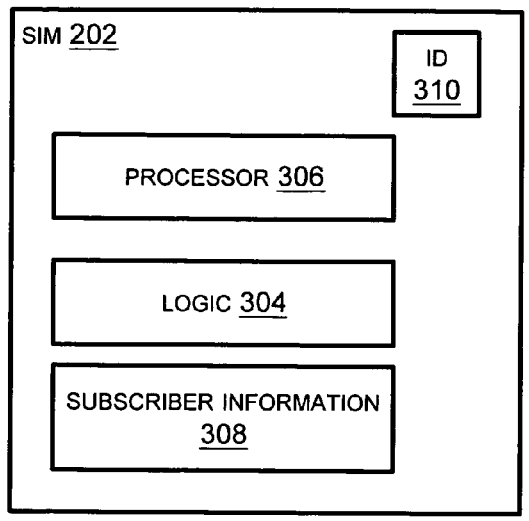
FIG. 3 is a block diagram of an embodiment of a subscriber identity module (SIM).

FIG. 3 is a block diagram of an embodiment of a subscriber identity module (SIM). The SIM 202 comprises an id 310, subscriber information 308, logic 304, and a processor 306.

The id 310 identifies the SIM 202. For example, the id 310 may comprise an Integrated Circuit Card ID (ICCID).

The subscriber information 308 may comprise information such as a subscriber id, media delivery preferences, presence information, usage information, demographic information, association information, and personalization information.

The subscriber id identifies a subscriber from among subscribers of the network. For example, the subscriber id may comprise an International Mobile Subscriber Identity (IMSI).

Media delivery preferences include information about the manner in which information should be communicated to the subscriber. Examples include frame rate, color schemes, visual quality, and visual layout. Usage information comprises information about the subscriber's access to the network environment, possibly including how, when, how often, and for what purpose the subscriber accessed the network environment. Usage information may include information about which services a subscriber accesses and/or how often, and/or the most recently used and/or most frequently accessed services. The usage information may also comprise information about trends and patterns in the subscriber's usage behavior.

Personal information describes a subscriber. Examples are the subscriber's name and address, as well as a subscriber's privacy information (restrictions on distribution of the subscriber profile information). Demographic information may be used to classify a subscriber for statistical, marketing, or other purposes. Examples include the subscriber's age, race, and gender. Association information describes other subscribers and/or subscribers that have an association with the subscriber. The association information may also describe the nature of the association. Examples include associates, family members, and patrons.

Personalization information describes a subscriber's preferred, most recent, and/or most frequent settings for services that the subscriber may access. Examples include a subscriber's preferred type of news information (sports, local events, etc.) and a subscriber's most frequent and/or most recent search queries.

Security information describes how the subscriber may protect information communicated to or from the network. Examples are digital signature and encryption key information. In various embodiments the subscriber security information may be applied to protect the communications of the subscribers associated with the subscriber. Alternatively, or in addition, the subscriber security information may be applied to protect the communications of the subscribers associated with the subscriber, independent of one another.

Access control information describes how the subscriber may access information and/or acts available via the network to which access is controlled. Examples include id and password information. In various embodiments the subscriber security information may be applied to provide the subscribers associated with the subscriber access to restricted information. Alternatively, or in addition, the subscriber access control information may be applied to provide the subscribers associated with the subscriber independent access to the restricted information.

The logic 304, when applied to the processor 306, may cause the SIM 202 to carry out acts of and in accordance with the methods described herein.

Figure 4:
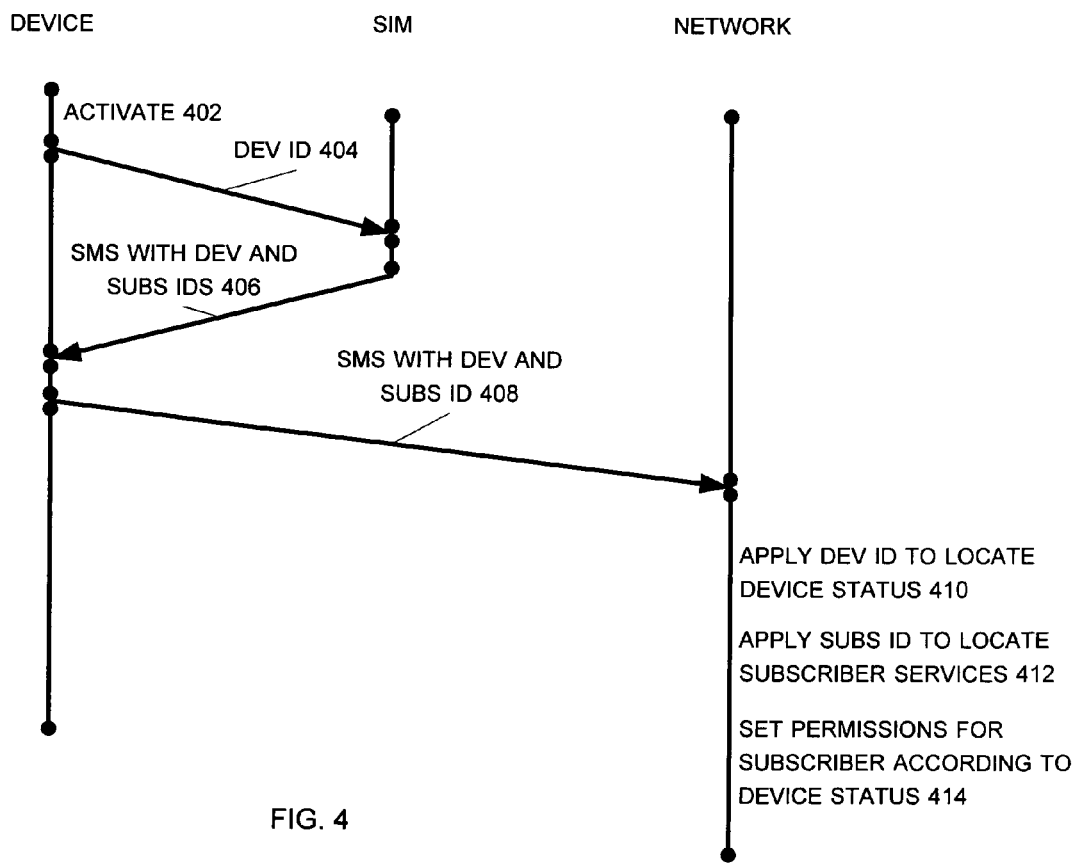
FIG. 4 is an action diagram of an embodiment of a method of identifying a device to a network.

FIG. 4 is an action diagram of an embodiment of a method of identifying a device to a network. At 402 the device is activated. "Activation" can be triggered by different events, including coupling (e.g. inserting) the SIM with the device, powering on the device with which the SIM coupled, and pressing a button or otherwise issuing a command to the device. Alternatively, it may be the SIM that is activated at 402, by coupling the SIM with the device. At 404 the device provides a device id to the SIM, either as a result of activation, or in response to a query to the device from the SIM, the query resulting from activation. At 406 the SIM provides to the device a Short Message Service (SMS) message including device and subscriber ids.

SMS, otherwise known as text messaging, mobile messaging, or alphanumeric paging, allows for the communication of short text and numeric messages to and from wireless devices, as well as to and from public SMS messaging gateways on the Internet.

Another communication technique that may be employed is Enhanced Message Service (EMS). EMS supports the capabilities of SMS to communicate short text and numeric messages, but also includes capabilities for the communication of other types of data, including sound, animation, graphics, and additional text-formatting capabilities.

Yet another communication technique that may be employed is Multimedia Message Service (MMS). MMS provides for the communication of video and other advanced multimedia formats. Yet another communication technique that may be employed is SyncML. SyncML is based on the Extensible Markup Language (XML), and provides a standard manner of synchronizing data between devices and network applications.

At 408 the device provides the SMS including the device and subscriber ids to the network. At 410 the network applies the device id to locate status for the device associated with the device id (for example, whether the device is lost or stolen).

At 412 the network applies the subscriber id to locate services for the subscriber associated with the subscriber id. Information about subscriber services may be comprised by the subscriber information 212. At 414 the network sets permissions for the subscriber according to the device status. For example, if the device status indicates a lost or stolen device, the network may set permissions that deny access to most or all services, with the possible exception of limited customer care services.

Figure 5:
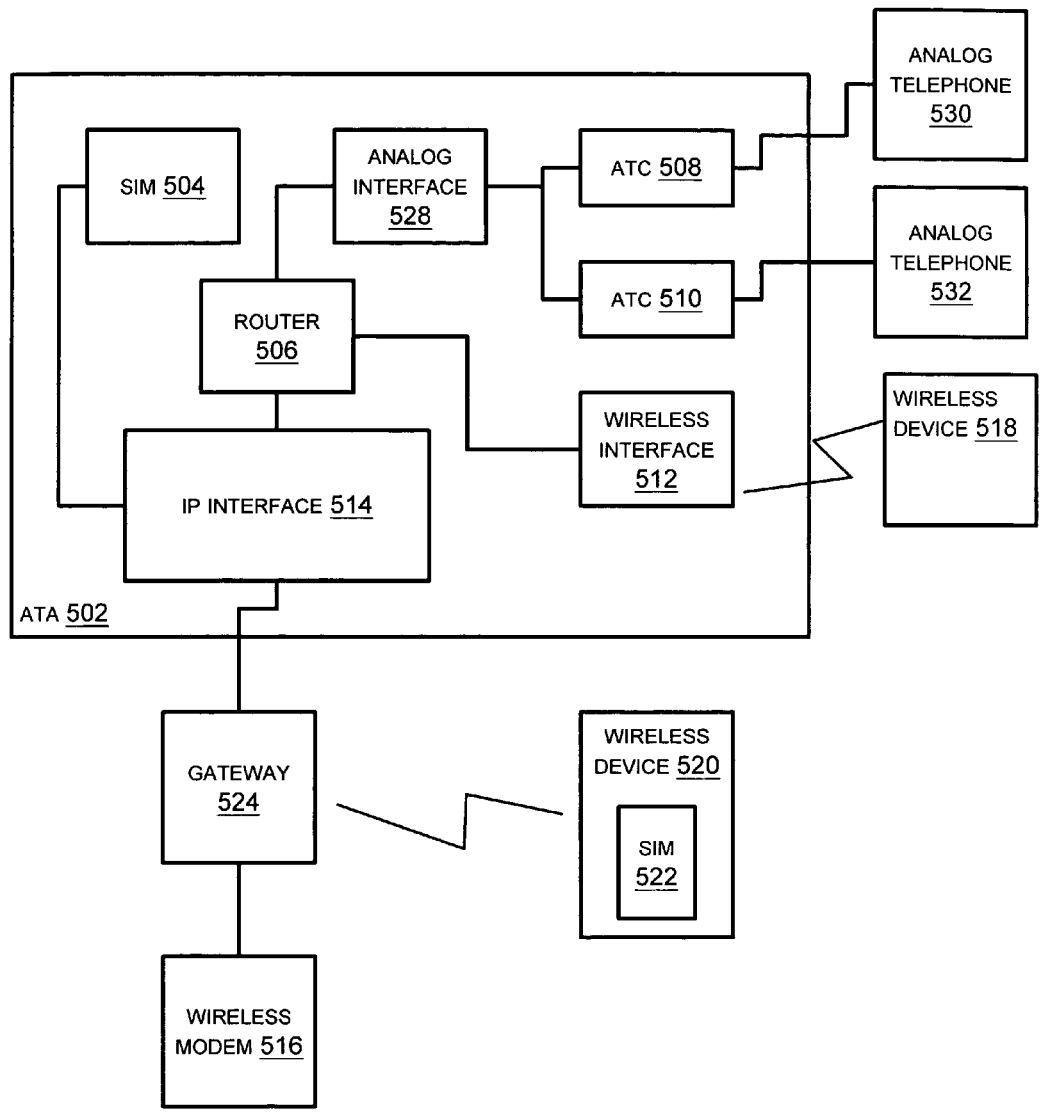
FIG. 5 is a block diagram of an embodiment of a wireless communication arrangement.

FIG. 5 is a block diagram of an embodiment of a wireless communication arrangement. An analog telephone adapter (ATA) 502 comprises a SIM 504, a router 506, analog telephone components (ATC) 508 and 510, a wireless interface 512, an IP interface 514, and an analog interface 528. The ATA 502 may be a mobile device, but more typically the ATA 502 will remain in a single location (such as a business or residence) for much of its use.

The SIM 504 is coupled to the IP interface 514. The router 506 is coupled to the analog interface 528 and the wireless interface 512. The analog interface 528 is coupled to the ATC 508 and the ATC 510. The ATC 508 is coupled to an analog telephone 530 532, and the ATC 510 is coupled to an analog telephone 532.

The IP interface 514 is coupled to a gateway 524, such as a digital router, hub, or firewall. The gateway 524 is coupled to a broadband modem, such as a wireless modem 516.

The ATC 508 provides an interface by which an analog telephone 530 may communicate with the analog interface 528. Likewise, the ATC 510 provides an interface by which an analog telephone 532 may communicate with the analog interface 528. The analog interface 528 translates analog communications from the ATCs 508, 510 into digital communications suitable for processing by the router 506. This may be accomplished, for example, using a digital signal processor. The analog interface 528 also translates communications from the router 506 to an analog form suitable for use by the analog telephones 532, 530. The analog interface 528 also directs communications from the router 506 to the appropriate analog telephone 532,530.

The wireless interface 512 provides an interface between a short-range (e.g. Bluetooth) wireless device 518 and the router 506.

The router 506 directs communications from the analog interface 528 and wireless interface 512 to the IP interface 514. Either the router 506 or the IP interface 514 may apply subscriber information of the SIM 504 to communications from the router. Thus, communications from the analog telephones 532,530 and the short-range wireless device 518 may be associated with subscriber information comprised by the SIM 504.

The router 506 also directs communications from the IP interface 514 to the analog interface 528 and the wireless interface 512. Routing may be based upon IP addresses assigned to communications to and from the analog telephones 532,530 and the wireless device 518.

A second wireless device 520 comprises a SIM 522. The second wireless device 520 may communicate with the gateway 524 without involvement of the ATA 502. Communications from the wireless device 520 may be associated with subscriber information of the SIM 522.

Figure 6:
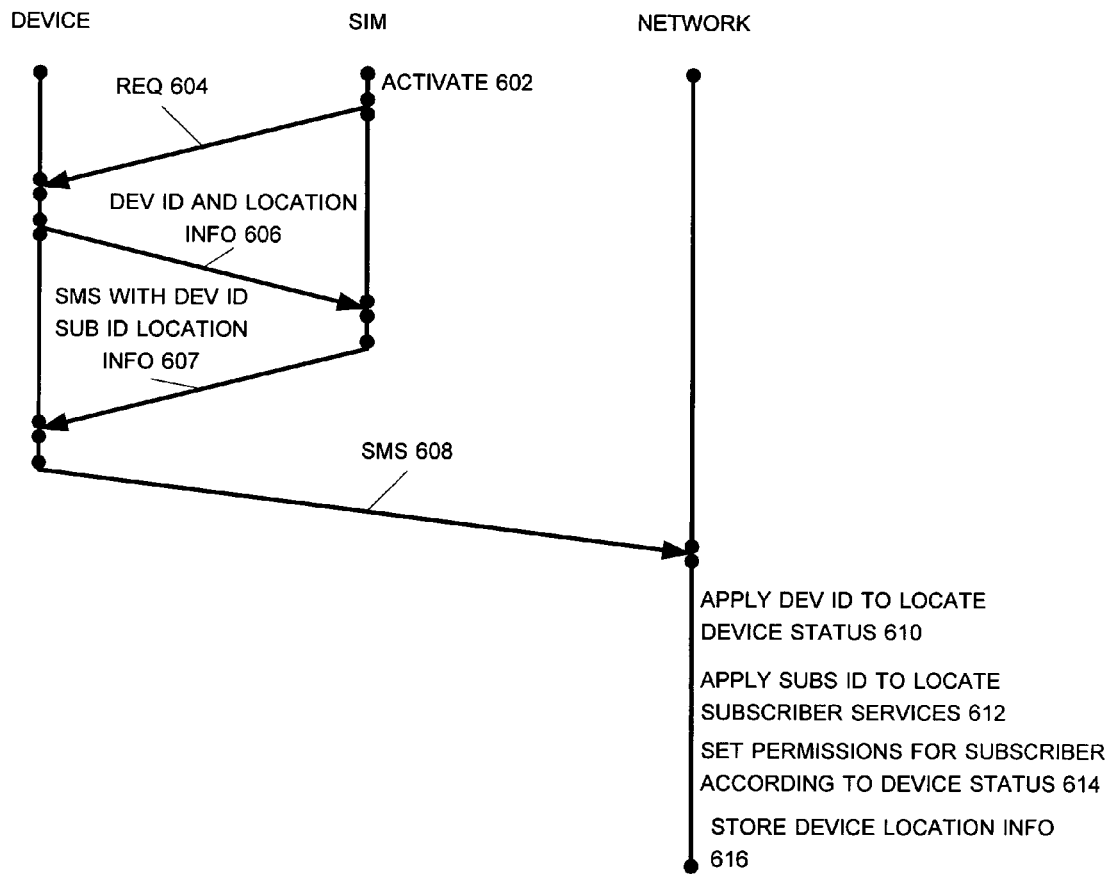
FIG. 6 is an action diagram of an embodiment of a method of identifying a device and providing a device location to a network.

FIG. 6 is an action diagram of an embodiment of a method of identifying a device and providing a device location to a network. At 602 the SIM is activated. Alternatively, the device could be activated by coupling the SIM and device, by powering on the device, by operating a button or control of the device, and so on. At 604, as a result of activation, the SIM provides a request to the device. At 606 the device provides a device id and location information to the SIM. At 607 the SIM provides an SMS (or EMS, MMS, or SyncML) message comprising the device id, subscriber id, and location information to the device. At 608 the device provides the SMS message to the network. At 610 the network applies the device id to locate device status for the device. At 612 the network applies the subscriber id to locate subscriber services. At 614 the network sets permissions for the subscriber according to the device status. At 616 the network stores the device location information. The location information may be important, for example, for locating the subscriber in the event of an emergency call.

Figure 7:
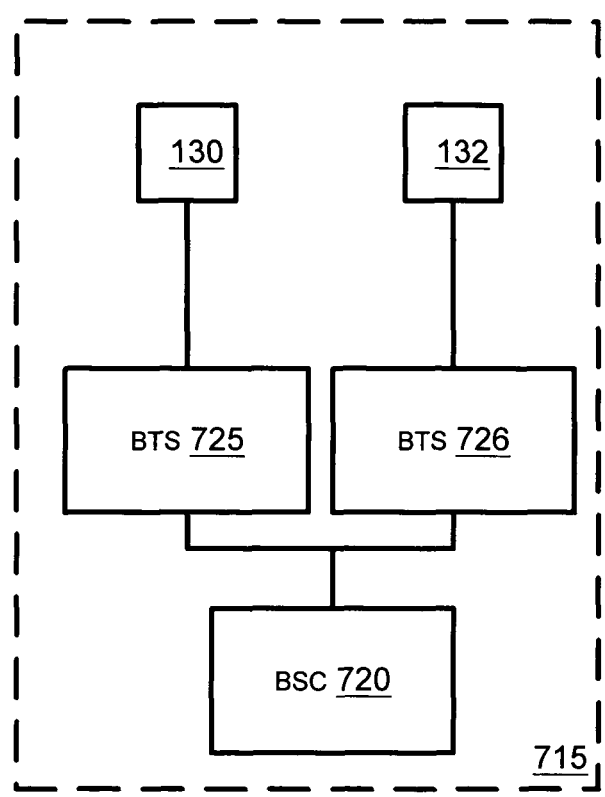
FIG. 7 is a block diagram of an embodiment of elements of a wireless communication network.

FIG. 7 is a block diagram of an embodiment of elements of a wireless communication network. The base station subsystem (BSS) 715 comprises base station controllers (BSC) 720, base transceiver stations (BTS) 725, 726, and antennae 130, 132.

BTS 725 is coupled to antenna 130, while BTS 726 is coupled to antenna 132. BTS 725 is coupled to BSC 720, and BTS 726 is coupled to BSC 720.

The BTS 725 includes transmitting and receiving equipment to create a radio interface between the wireless network and terminal devices. Although the antennae 130, 132 are shown as a separate elements for clarity, it is common in the industry to collectively refer to the antennae 130, 132, transmitter, and receiver, as the BTS.

The BSC 720 may perform management of the radio interface by allocating channels, managing handover from one BTS to another, paging the wireless device, and transmitting connection-related signaling data.

Figure 8:
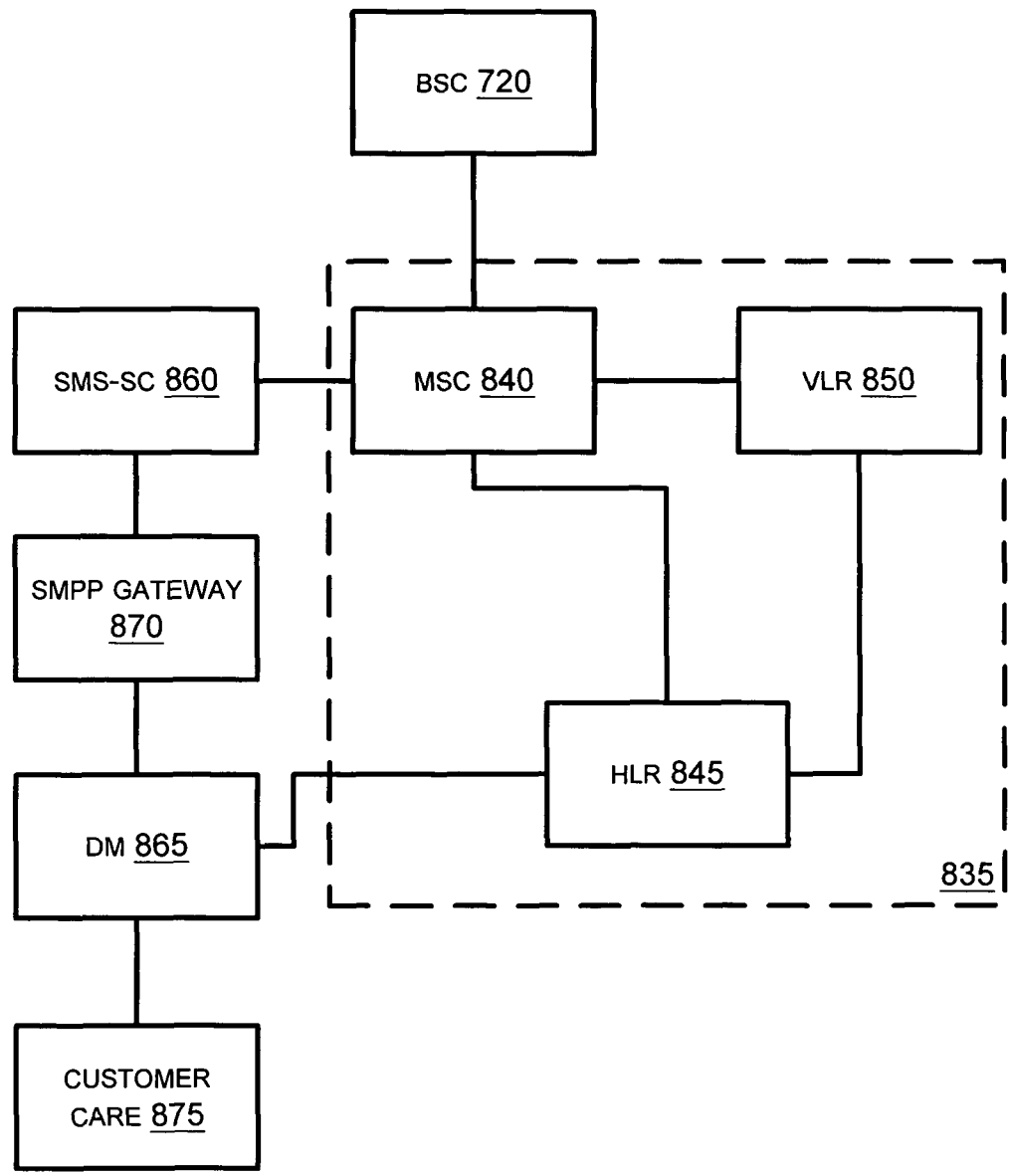
FIG. 8 is a block diagram of an embodiment of elements of a wireless communication network.

FIG. 8 is a block diagram of an embodiment of elements of a wireless communication network. The networking and switching subsystem (NSS) 835 of a wireless network comprises a Mobile Switching Center (MSC) 840, a Home Location Registry (HLR) 845, and a Visitor Location Registry (VLR) 850.

The MSC 840 is coupled to the BSC 720, a Visitor Location Registry (VLR) 850, an SMS Service Center (SMS-SC) 860, and a Home Location Registry (HLR) 845. The HLR 845 is coupled to the VLR 850.

The SMS-SC 860 is coupled to a Short Message Peer to Peer (SMPP) gateway 870. The SMPP gateway 870 is coupled to a device management (DM) network element 865. The DM 865 is coupled to a customer care facility 875. The customer care facility 875 is any facility that can associate and/or apply permissions to device requests for network services. The DM 865 may be coupled to one or more network elements comprising the subscriber information. For example, the DM 865 may be coupled to the HLR 845 in embodiments where the HLR 845 comprises the subscriber information.

Switching and network management functions are carried out by the NSS 835. The NSS 835 may also act as a gateway between the wireless network and other networks such as the Public Switched Telephone Network (PSTN), Integrated Services Digital Network (ISDN), the Internet, other wireless networks, and the Public Data Network (PDN).

The MSC 840 is a digital switching mechanism that routes communications and manages the network. In GPRS networks, GPRS support nodes (GSNs) such as Switching GSNs (SGSNs) may provide switching operations similar to those provided by the MSC 840. There can be many switches 840 in a communication network, each responsible for the signaling required to set up, maintain, and terminate connections to wireless devices within the geographical area served by the switch 840. Each MSC (switch) 840 may manage several BSCs 720.

In one embodiment, at least part of the subscriber information 212 is comprised by the HLR 845. Also, the HLR 845 may comprise certain dynamic or temporary subscriber data such as current Location Area (LA) of the subscriber's mobile station and Mobile Station Roaming Number (MSRN). Subscriber-related data is recorded in the HLR 845 from which billing and administrative information is extracted when needed by the cellular service provider. Some wireless networks have only one HLR 845 that serves all subscribers; others have multiple HLRs.

The MSC 840 uses the VLR 850 to manage the wireless devices that are currently roaming in the area controlled by the MSC 840. The VLR 850 stores information such as the International Mobile Subscriber Identity (IMSI), authentication data, and telephone number of the roaming wireless devices. The VLR 850 may obtain and comprise subscriber information, such as information about the services to which a roaming wireless device is entitled, from the HLR 845 that serves the wireless device. The VLR 850 controls a pool of MSRN and allocates an MSRN and TMSI to the roaming wireless device. The VLR 850 sends the MSRN and Temporary Mobile Subscriber Identity (TMSI) information to the HLR 845 where they are stored with the subscriber's dynamic records for later use in call routing.

In one embodiment the VLR 850 comprises at least part of the subscriber information for the users of wireless devices that are roaming the network.

Figure 9:
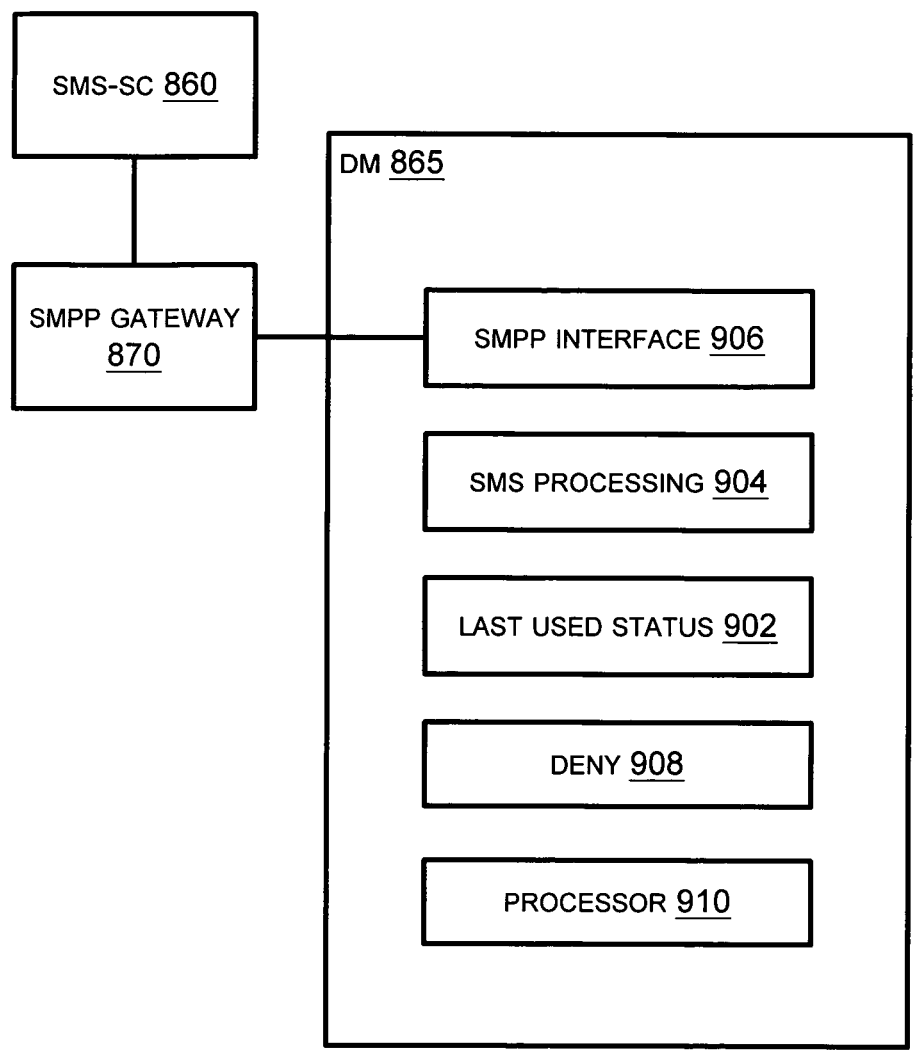
FIG. 9 is a block diagram of an embodiment of an arrangement to facilitate device management.

FIG. 9 is a block diagram of an embodiment of an arrangement to facilitate device management. The DM 865 comprises a collection of last used status 902 information for devices that access the network. The DM 865 comprises SMS processing logic 904 to receive, parse, and interpret SMS messages (the logic 904 may also, or alternatively, comprise logic to receive and process EMS, MMS, and SyncML messages), and a processor 910 to execute some or all of the processing logic. The DM 865 comprises an SMPP interface 906 coupled to the SMPP gateway 870, by which to communicate with the network via SMPP. In GPRS networks, GSNs such as and Gateway GSNs (GGSNs) may provide functionality similar to that provided by the SMPP gateway 870. The DM 865 comprises a deny database 908 containing information about which devices to deny access to network services—for example, lost or stolen devices.

An SMS message from a device is communicated via the BSC 720 to the MSC 840. The MSC 840 communicates the SMS message, for example, via Signaling System 7 (SS7) to the SMS-SC 860. The SMS-SC 860 communicates the SMS message to the SMPP gateway 870, which communicates the SMS message via SMPP to the SMPP interface 906 of the DM 865. The DM 865 applies the SMS processing logic 904 to process the SMS message to determine the device and subscriber ids. The DM 865 provides the device id to the customer care facility 875. The customer care facility 875 may apply the device id to provide a better customer care experience (for example, by accessing and displaying a picture of the device to a customer care representative). The customer care facility 875 may interact with the DM 865 to determine whether the last used status 902 indicates the device is lost, stolen, or malfunctioning. The customer care facility 875 may interact with the deny database 908 to determine whether service requests originating from the device should be granted or denied. The DM 865 and/or customer care facility 875 may interact with the repository of subscriber information 212 (for example, the HLR 845 and/or VLR 850) to locate the subscriber corresponding to the subscriber id, and to set permissions for the subscriber according to the last used status 902.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein,"

"above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

What is claimed is:

1. A method for performing equipment identity registry functionality, the method comprising:
   receiving, by a network, a short messaging service message from a wireless device, wherein the wireless device sends the short messaging service message, wherein the short messaging service message comprises a device identifier, a subscriber identifier of a subscriber of the wireless device, and location information associated with the wireless device, wherein the wireless device provides the device identifier of the wireless device and the location information of the wireless device to a subscriber identity module in response to the subscriber identity module being coupled to the wireless device, and wherein the subscriber identity module provides the subscriber identifier to the wireless device in response to receiving the device identifier and the location information;
   based on the device identifier, locating, by the network, a status of the wireless device, the status identifying whether the wireless device was lost or stolen based on information stored by a device management network element in a deny database, wherein the network provides connection services for the wireless device, wherein the network does not comprise an equipment identity registry;
   based on the subscriber identifier, locating, by the network, services for the subscriber;
   based on the status, setting, by the network, permissions for the subscriber, wherein based on the wireless device having the status identifying that the wireless device was lost or stolen, the permissions deny access to all services except limited customer care services; and
   storing, by the network, the location information, wherein the location information is applied for locating a user in an event of an emergency call.

2. The method of claim 1, further comprising extracting an international mobile equipment identity from the short messaging service message.

3. The method of claim 1, further comprising setting network access permissions according to a device status of the wireless device.

4. The method of claim 1, further comprising communicating a device status of the wireless device to a customer care facility.

5. The method of claim 1, further comprising extracting an international mobile subscriber identity from the short messaging service message.

6. A network element comprising:
   a processor; and
   a memory that stores instructions, that when executed by the processor, causes the processor to perform operations for performing equipment identity registry functionality, the operations comprising:
      receiving a short messaging service message from a wireless device, wherein the wireless device sends the short messaging service message, wherein the short messaging service message comprises a device identifier, a subscriber identifier of a subscriber of the wireless device, and location information associated with the wireless device, wherein the wireless device provides the device identifier of the wireless device and the location information of the wireless device to a subscriber identity module in response to the subscriber identity module being coupled to the wireless device, and wherein the subscriber identity module provides the subscriber identifier to the wireless device in response to receiving the device identifier and the location information;
      based on the device identifier, locating a status of the wireless device, the status identifying whether the wireless device was lost or stolen based on information stored by a device management network element in a deny database, wherein a network provides connection services for the wireless device, wherein the network does not comprise an equipment identity registry;
      based on the subscriber identifier, locating services for the subscriber;
      based on the status, setting permissions for the subscriber, wherein based on the wireless device having the status identifying that the wireless device was lost or stolen, the permissions deny access to all services except limited customer care services; and
      storing the location information, wherein the location information is applied for locating a user in an event of an emergency call.

7. The network element of claim 6, wherein the operations further comprise setting network access permissions according to a device status of the wireless device.

8. The network element of claim 6, wherein the operations further comprise extracting an international mobile equipment identity from the short messaging service message.

9. The network element of claim 6, wherein the operations further comprise communicating a device status of the wireless device to a customer care facility.

10. The network element of claim 6, wherein the operations further comprise extracting an international mobile subscriber identity from the short messaging service message.

11. A system comprising:
   a deny database comprising a plurality of device identifiers identifying lost devices or stolen devices; and
   a network element in communication with the deny database, the network element comprising a memory storing instructions that, when executed by a processor, causes the processor to perform operations for performing equipment identity registry functionality, the operations comprising
      receiving a short messaging service message from a wireless device, wherein the wireless device sends the short messaging service message, wherein the short messaging service message comprises a device identifier, a subscriber identifier of a subscriber of the wireless device, and location information associated with the wireless device, wherein the wireless device provides the device identifier of the wireless device and the location information of the wireless device to a subscriber identity module in response to the subscriber identity module being coupled to the wireless device, and wherein the subscriber identity module provides the subscriber identifier to the wireless device in response to receiving the device identifier and the location information;
      based on the device identifier, locating a status of the wireless device, the status identifying whether the wireless device was lost or stolen based on information stored by a device management network element in the deny database, wherein a network provides connection services for the wireless device, wherein the network does not comprise an equipment identity registry;

based on the subscriber identifier, locating services for the subscriber;

based on the status, setting permissions for the subscriber, wherein based on the wireless device having the status identifying that the wireless device was lost or stolen, the permissions deny access to all services except limited customer care services; and storing the location information, wherein the location information is applied for locating a user in an event of an emergency call.

12. The system of claim 11, wherein the operations further comprise extracting an international mobile equipment identity from the short messaging service message.

13. The system of claim 11, wherein the operations further comprise extracting an international mobile subscriber identity from the short messaging service message.

14. The system of claim 11, further comprising a messaging service center for transmitting the short messaging service message.

15. The system of claim 11, further comprising a customer care facility in communication with the network element.

16. The system of claim 15, wherein the customer care facility applies the device identifier to provide an improved customer care experience by accessing a picture of the wireless device and displaying the picture of the wireless device to a customer care representative.

* * * * *